US006773927B2

(12) United States Patent
Osawa et al.

(10) Patent No.: US 6,773,927 B2
(45) Date of Patent: Aug. 10, 2004

(54) PIPETTING APPARATUS AND A METHOD OF PIPETTING A LIQUID

(75) Inventors: Hidetaka Osawa, Hitachinaka (JP); Masahiro Inaniwa, Hitachinaka (JP); Toyosaku Sato, Hitachinaka (JP)

(73) Assignee: Hitachi Koki Co., Ltd., Tokyo (JP)

(*) Notice: Subject to any disclaimer, the term of this patent is extended or adjusted under 35 U.S.C. 154(b) by 0 days.

(21) Appl. No.: 09/781,224

(22) Filed: Feb. 13, 2001

(65) Prior Publication Data

US 2001/0016358 A1 Aug. 23, 2001

(30) Foreign Application Priority Data

Feb. 18, 2000 (JP) .................................... 2000-040766

(51) Int. Cl.[7] .............................. B01L 3/02; G01N 1/10

(52) U.S. Cl. ...................... 436/180; 73/863.32; 73/864; 73/864.01; 73/864.02; 73/864.11; 73/864.16; 422/100

(58) Field of Search .................. 422/100, 99; 436/180; 73/863.32, 864, 864.01, 864.11, 864.16

(56) References Cited

U.S. PATENT DOCUMENTS 4,399,712 A * 8/1983 Oshikubo et al. ......... 73/864.16
5,360,596 A * 11/1994 Pennatto ...................... 422/63
5,601,980 A * 2/1997 Gordon et al. ................ 435/6
5,747,350 A * 5/1998 Sattler ........................ 436/180
5,762,877 A * 6/1998 Brewer ....................... 422/100
5,770,160 A * 6/1998 Smith et al. ................ 422/100
5,879,627 A * 3/1999 Tanihata ..................... 422/67
5,919,706 A * 7/1999 Tajima ........................ 436/54
6,083,762 A * 7/2000 Papen et al. ................ 436/180
6,100,094 A * 8/2000 Tajima ........................ 436/54
6,158,269 A * 12/2000 Dorenkott et al. ............ 73/37
6,168,761 B1 * 1/2001 Kelly ......................... 422/100
6,171,553 B1 * 1/2001 Petrek ........................ 422/100
6,203,759 B1 * 3/2001 Pelc et al. .................. 422/100
6,232,129 B1 * 5/2001 Witor ......................... 436/180
6,245,297 B1 * 6/2001 Kowallis ..................... 422/66
6,248,295 B1 * 6/2001 Petrek ........................ 422/100
6,277,334 B1 * 8/2001 Ecker et al. ................ 422/131
6,387,330 B1 * 5/2002 Bova et al. ................. 422/100
6,416,718 B1 * 7/2002 Maiefski et al. ............ 422/103
6,420,186 B1 * 7/2002 Berger et al. ............... 436/180
6,455,006 B1 * 9/2002 Mukai ........................ 422/100
2001/0001447 A1 * 5/2001 Pelc et al. ..................... 436/49
2001/0016177 A1 * 8/2001 Pelc et al. .................. 422/100
2001/0036424 A1 * 11/2001 Takahashi et al. .......... 422/100
2002/0051737 A1 * 5/2002 Sollbohmer et al.
2002/0064482 A1 * 5/2002 Tisone et al.

* cited by examiner

*Primary Examiner*—Jill Warden
(74) *Attorney, Agent, or Firm*—McDermott Will & Emery LLP

(57) ABSTRACT

A position of a piston fluid-tightly sliding along an inner surface of a pipette is instantaneously changed by a short distance to jet a portion of a liquid in the pipette through the nozzle of the pipette as a drop. The instantaneously changed position is provided by a motor which is commonly used for moderately changing the position of the piston to taking-in and taking-out the liquid. The instantaneous minute position changing may be provided with a piezoelectric actuator. An attachable nozzle cap having a nozzle-cap nozzle (through hole) of which diameter is smaller than that of the nozzle of the pipette may be used. The portion of the liquid jetted from the pipette may be detected. The instantaneous changing may be repeated to jet a desired amount of said liquid. The short distance may be adjusted in accordance with the desired amount.

25 Claims, 8 Drawing Sheets

PIPETTING APPARATUS AND A METHOD OF PIPETTING A LIQUID

BACKGROUND OF THE INVENTION

1. Field of the Invention

This invention relates to a pipetting apparatus for pipetting a liquid and a method of pipetting a liquid.

2. Description of the Prior Art

A pipetting apparatus for pipetting a liquid for pipetting a desired amount of the liquid and the corresponding method are known.

In the prior art pipetting apparatus and the method, at first, a desired amount of a liquid is sucked into a pipette through the nozzle thereof. Next, the pipette is moved to a position above a vessel or the like and discharges the liquid through the nozzle. During this operation, it is frequent that a dope of the liquid remains at the tip of the pipette. In the high accuracy pipetting operation, to take the drop of the liquid into the vessel, the tip is touched to an inner wall of the vessel such that the drop is coated on the inner surface, which is so called tip-touching operation. Further, the drop on the inner surface of the vessel is dropped with a centrifugal apparatus to move the drop toward the bottom of the vessel, which is so called spin-down operation.

SUMMARY OF THE INVENTION

The aim of the present invention is to provide a superior pipetting apparatus and a superior method of pipetting a liquid.

According to the present invention, a first aspect of the present invention provides a pipetting apparatus comprising: a pipette having a nozzle; pipette holding means for holding said pipette; a piston fluid-tightly sliding along an inner wall of said pipette; piston holding means for holding a portion of said piston; and instantaneous position changing means for changing a position of said piston with said piston holding means by a short distance with respect to said pipette holding means to jet a portion of a liquid in said pipette through said nozzle as a drop.

According to the present invention, a second aspect of the present invention provides a pipetting apparatus based on the first aspect, wherein said instantaneous position changing means comprises a motor, said pipetting apparatus further comprises moderately position changing means for moderately changing said position of said piston with said motor to suck and discharge a desired amount of said liquid, and said motor is commonly used between said instantaneous position charging means and said moderately position changing means.

According to the present invention, a third aspect of the present invention provides a pipetting apparatus based on the first aspect, wherein said instantaneous position changing means comprises a piezoelectric actuator.

According to the present invention, a fourth aspect of the present invention provides a pipetting apparatus based on the first aspect, further comprising an attachable nozzle cap being attachable to said pipette and having a nozzle-cap nozzle (through hole) for jetting said portion of said liquid through said nozzle and said nozzle-cap nozzle, a diameter of said nozzle-cap nozzle being smaller than that of said nozzle.

According to the present invention, a fifth aspect of the present invention provides a pipetting apparatus based on the first aspect, further comprises; detection means for detecting said portion of said liquid jetted from said pipette; and confirming means in response to said instantaneous position changing means and said detection means for confirming that said portion of said liquid is jetted and outputting a confirmed result.

According to the present invention, a sixth aspect of the present invention provides a method of pipetting a liquid with a pipette and a piston fluid-tightly sliding along an inner wall of said pipette comprising the steps of: (a) sucking said liquid with said piston; and (b) instantaneously changing a position of said piston with respect to said pipette by a short distance to jet a portion of a liquid in said pipette through said nozzle.

According to the present invention, a seventh aspect of the present invention provides a method based on the sixth aspect, wherein said step (b) is repeated to jet a desired total amount of said liquid.

According to the present invention, an eighth aspect of the present invention provides a method based on the sixth aspect further comprising the step of determining said short distance in accordance with a desired amount, wherein in step (b), said position of said piston is changed instantaneously by said short distance determined in accordance with said desired amount.

According to the present invention, a ninth aspect of the present invention provides a method based on the sixth aspect, between the steps of (a) and (b), further comprising the steps of attaching an attachable nozzle cap to said pipette at said nozzle, said attachable nozzle cap having a nozzle-cap nozzle (through hole) of which diameter is smaller than that of said nozzle; and changing said position of said piston to fill with said liquid in said attachable nozzle cap, wherein in said step (b), said portion of said liquid is jetted through said nozzle and said attachable nozzle cap.

According to the present invention, a tenth aspect of the present invention provides a method based on the sixth aspect, further comprising the steps of: detecting said portion of said liquid jetted from said pipette; and confirming that said portion of said liquid is jetted in response to said instantaneous position changing means and said detection means and outputting a confirmed result.

According to the present invention, an eleventh aspect of the present invention provides pipetting apparatus comprising: pipette holding means for holding a pipette having a nozzle and a piston fluid-tightly sliding along an inner wall of said pipette; piston holding means for holding a portion of said piston; and moving means for moving said piston toward said nozzle by a short distance with respect to said pipette holding means for a short time interval to jet a portion of a liquid in said pipette as a drop through said nozzle.

According to the present invention, a twelfth aspect of the present invention provides a pipetting apparatus based on the twelfth aspect, wherein an amount of said drop is determined in accordance with a size of said nozzle, said short distance and said short time interval.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

<First Embodiment>

Figure 1:
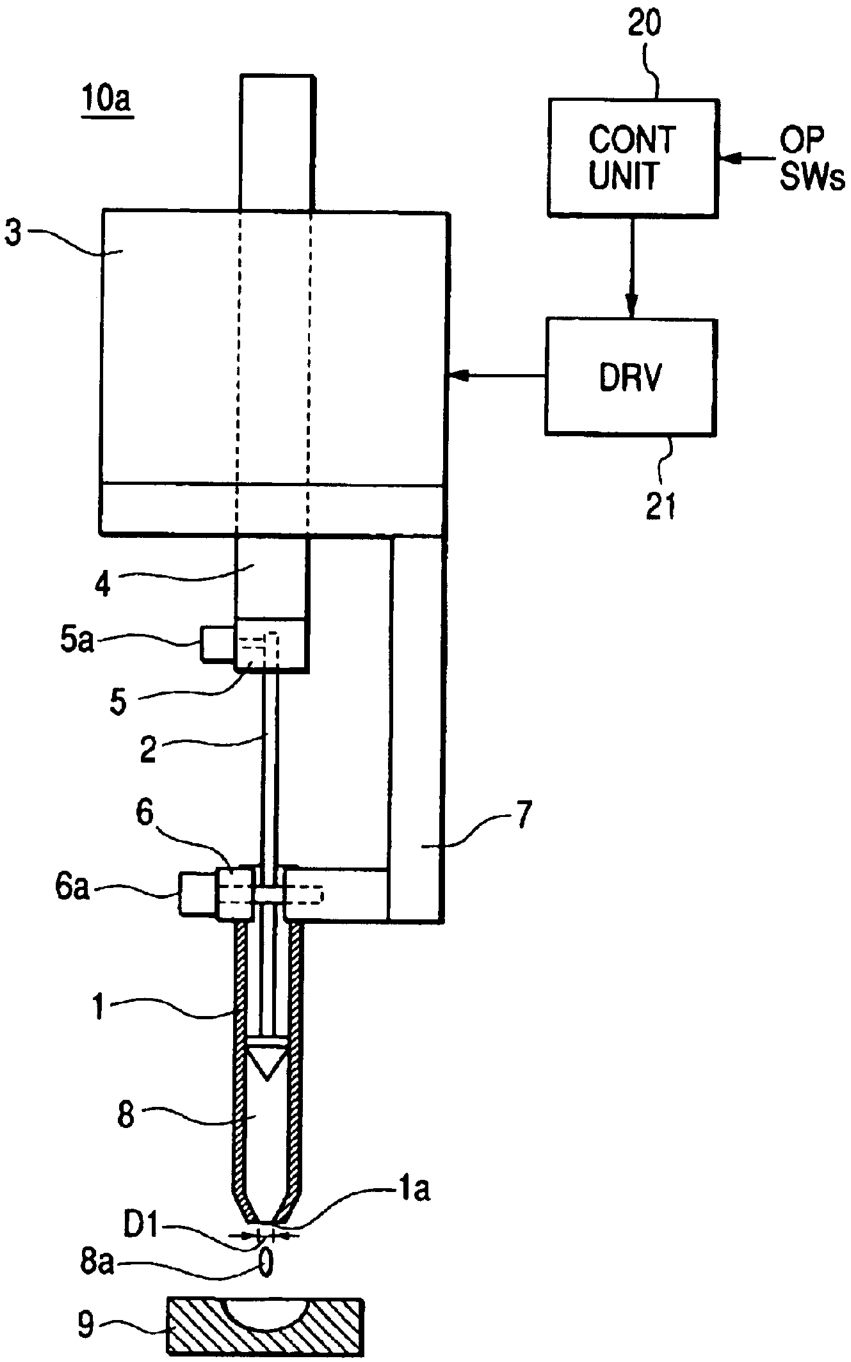
FIG. 1 is a side view of a pipetting apparatus according to a first embodiment.
Figure 2A:
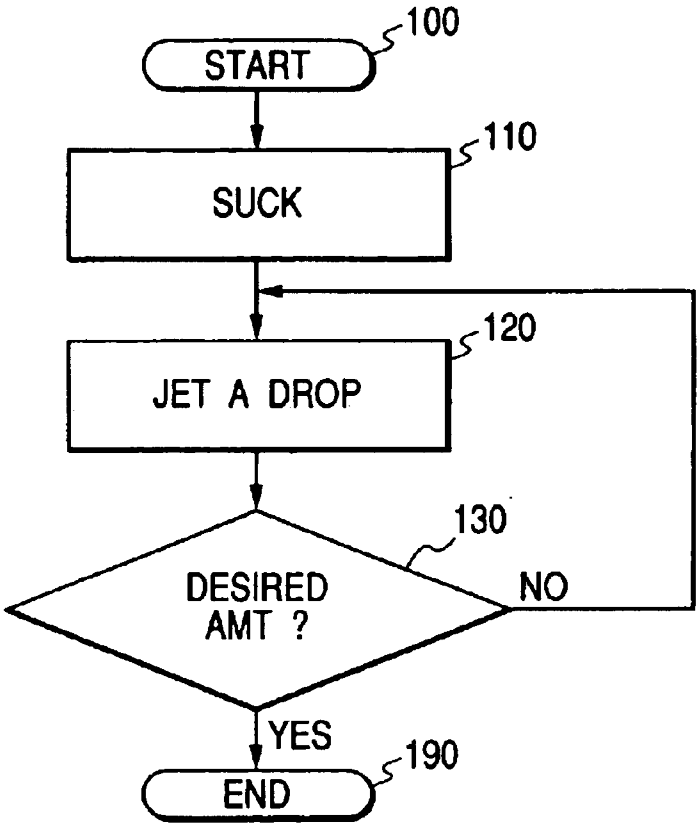
FIG. 2A depicts a flow chart showing a method of pipetting a liquid with the pipetting apparatus according to the first embodiment.

FIG. 1 is a side view of a pipetting apparatus 10*a* according to a first embodiment. FIG. 2A depicts a flow chart showing a method of pipetting a liquid with the pipetting apparatus according to the first embodiment.

A C-angle 7 supports a motor (linear stepping motor) 3 and a pipette holder 6 having a screw 6*a* for holding (or releasing) a pipette 1. A piston 2 is fluid-tightly slides along the inner surface of the pipette 1. An end of the piston 2 is connected to (or disconnected from) a shaft 4 with a piston holding portion 5 having a screw 5*a*. The shaft 4 is driven by the linear step motor 3. A control unit 20 generates a control signal to control the linear step motor 3. A driver 21 generates a drive signal in accordance with the control signal. The linear step motor 3 moves the shaft 4 along the axis of the shaft 4 in response to the drive signal from the driver 21. The C-angle 7 is supported by a base (not shown) on a table, a hand of a human being, or a robot hand, above a vessel on the table.

The linear movement of the shaft 4 moves the piston 1 to suck a liquid and discharge the liquid. The control unit 20 generates the control signal such that a pulse train signal to make the driver generate the drive signals to control the direction of movement and the speed and position the piston 2.

In operation, the pipette 1 is fixed to the pipette holder 6 with a screw 6*a* and the piston 2 is fixed to the piston holder 5 with the screw 5*a* as shown in FIG. 1. Next, the pipetting operation is started in response to a request for starting the pipetting operation from an operation switch (not shown) for example in step 100 as shown in FIG. 2A.

In step 110, the control unit 20 controls the driver 21 to position the piston 2 at the predetermined lower end of the pipette 1 with the linear stepping motor 3. Next, the tip of the pipette 1 is submerged in the liquid 8 by the hand of a human being or robot handle (not shown). Next, the piston 2 is moderately moved upwardly (in the drawing) by a given amount to suck the liquid 8 in the pipette 1 at a relatively low speed. If the piston 2 is moved at a relatively high speed, the air enters blow the piston 2. Thus, the piston 2 is moved upwardly at a lower speed to surely suck a liquid having a higher viscosity.

Next, the tip of the pipette 1 is directed to a vessel 9 by the hand or the robot arm.

Next, in response to a switch the control unit 20 generates the pulse signal of which pulse rate is relatively high to push the piston 2 by a short distance of about tens micron meters by the liner stepping motor 3 in step 120. This short position change of the piston 2 toward the nozzle 1*a* jets a drop 8*a* (a portion) of the liquid 8 through the nozzle 1*a*. The pulse signal includes pulses at a high pulse rate such that the piston 2 hits the liquid 8. The jetted drop 8*a* drops into the vessel 9.

In the following step 130, the control unit 20 judges whether the desired amount of the liquid 8 has been pipetted. If No, processing in step 120 is repeated until the desired amount of the liquid 8 has been pipetted.

If the desired amount of the liquid 8 has been pipetted in step 130, the control unit 20 finishes the pipetting operation.

The amount of the drop 8*a* is controlled by the distance of the instantaneous position change of the piston 2. FIG. 2A shows this operation. In step 105, the control unit 20 determines the distance of the instantaneous position change of the piston 2 in accordance with the amount of the drop 8*a*. This processing is executed before the sucking operation in step 110. The control unit 20 generates the control signal to provide the distance of the instantaneous minute position change of the piston 2 determined in step 105.

If this operation is repeated to pipette the liquid 8 in another vessel, the processes in steps 120 and 130 are executed again. If the liquid 8 remains after finish of the processing, the liquid 8 can be returned to the source vessel.

If another liquid is pipetted after pipetting the liquid 8, the used pipette 1 and the used piston 2 are exchanged with a new pipette 1 and a new piston 2 to avoid contamination. 11.

As mentioned above, in the pipetting apparatus, the pipette holder 6 holds the pipette 1 having the nozzle 1*a*, the piston holder 5 holds a portion of the piston 2 which fluid-tightly slides along an inner wall of the pipette 1, and the control unit 20, the driver 21, and the linear step motor 3 moves the piston 2 with the piston holder 5 toward the nozzle 1*a* by a short distance for a short time interval to jet a portion of the liquid 8 in the pipette through the nozzle 1*a* as the drop 8*a*. The amount of the drop 8*a* is determined in accordance with a size of the nozzle 1*a*, the short moving distance of the piston 2, and the short time interval.

<Second Embodiment>

Figure 3A:
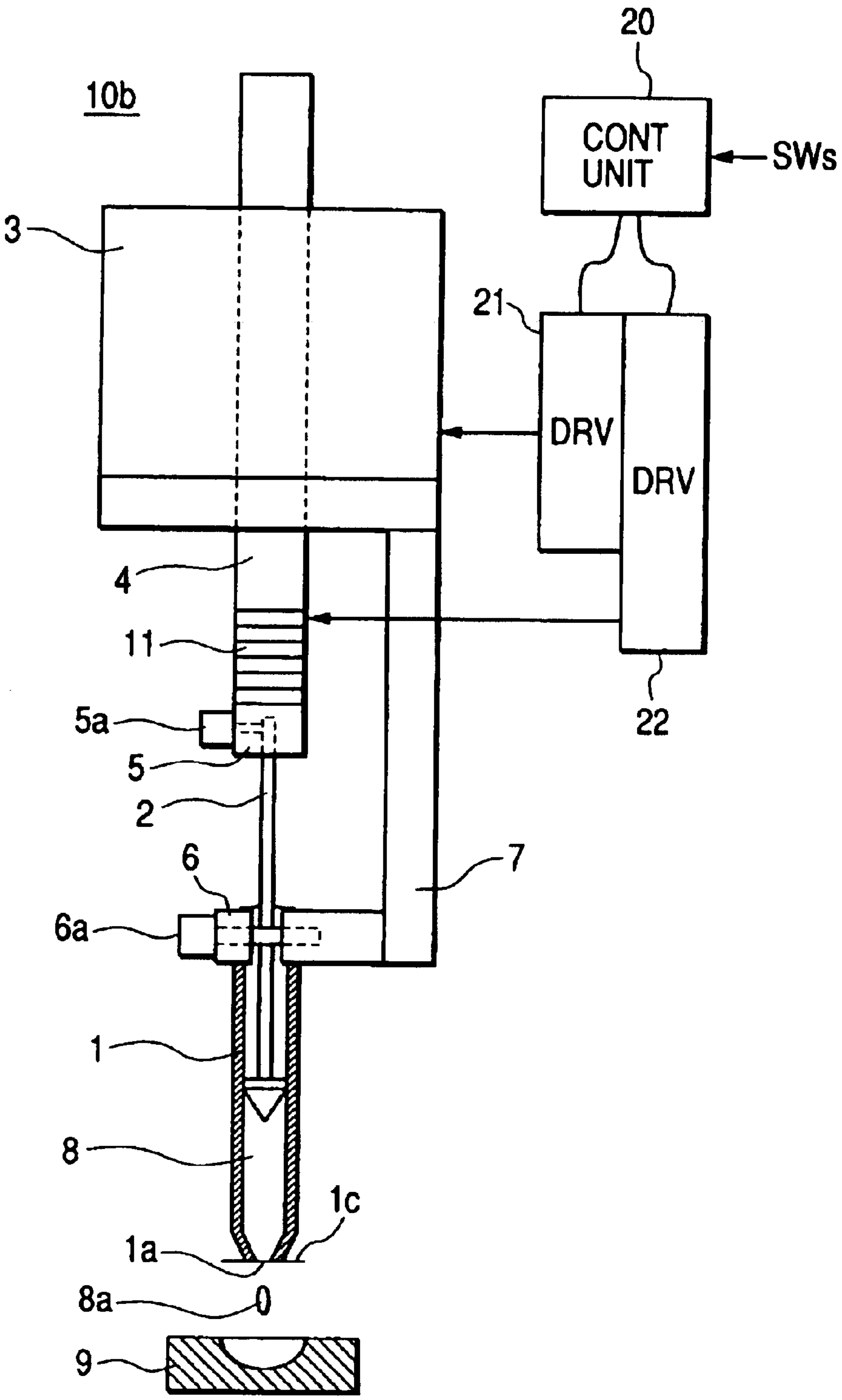
FIG. 3A is a side view of a pipetting apparatus according to a second embodiment.
Figure 3B:
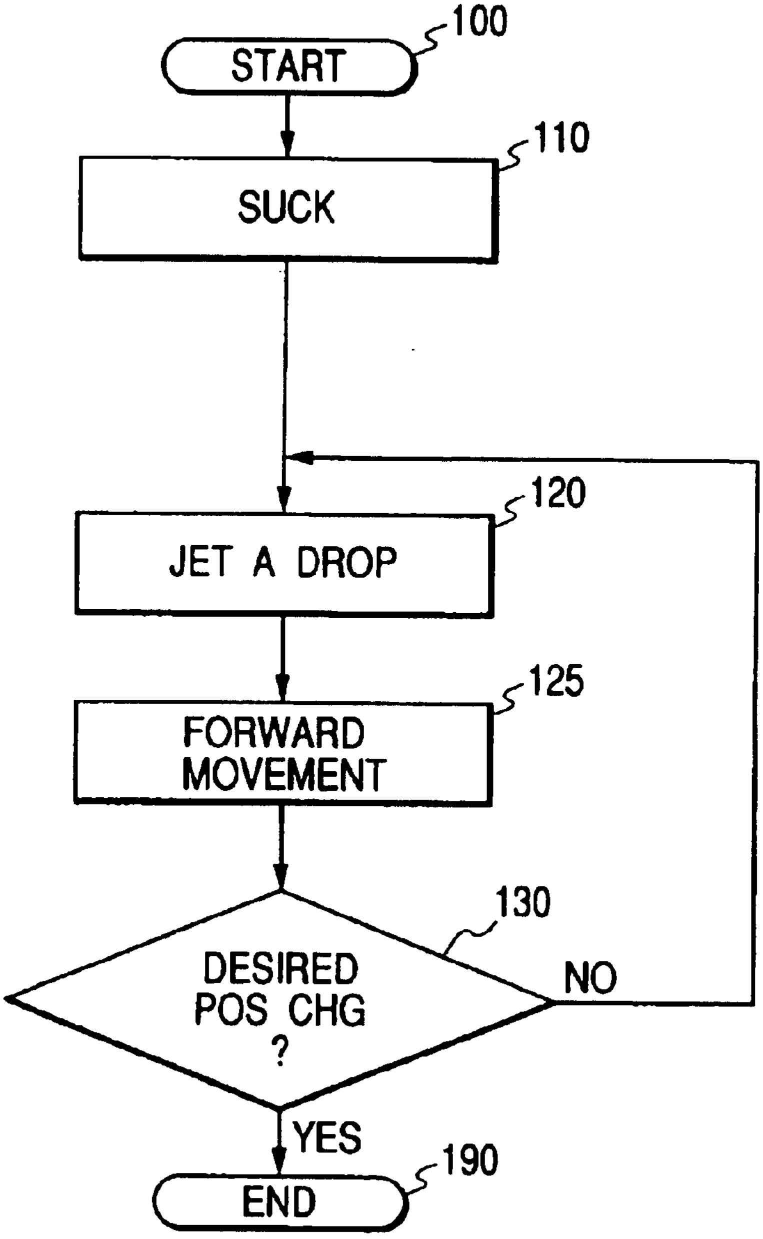
FIG. 3B depicts a flow chart showing a method of pipetting a liquid with the pipetting apparatus according to the second embodiment.

FIG. 3A is a side view of a pipetting apparatus 10*b* according to a second embodiment. FIG. 3B depicts a flow chart showing a method of pipetting a liquid with the pipetting apparatus according to the second embodiment.

The pipetting apparatus according to the second embodiment has substantially the same structure as that of the first embodiment. The difference is that a piezoelectric actuator 11 and a piezoelectric actuator driver 22 are further provided. The control unit 20 generates a piezoelectric driver control signal in addition to generating the control signal for the linear stepping motor 3. The piezoelectric actuator 11 is provided between the shaft 4 of the linear stepping motor 3 and the piston holder 5.

The piezoelectric driver 22 includes a high speed power amplifier for amplifying the analog voltage signal from the control unit 20 ranging from zero to five DC volts to provide the drive signal ranging from zero volts to DC 150 V. The piezoelectric actuator 11 extends in response to the drive signal from the piezoelectric driver 22, wherein the maximum distance of position change is about 50 $\mu$m at DC 150 V.

The operation of the pipetting apparatus according to the second embodiment is substantially similar to that of the first embodiment. That is, the operation of sucking the liquid (step 110) is same as that of the first embodiment.

In step 120, the control unit 20 generates the piezoelectric driver control signal to provide a DC 150V across the piezoelectric actuator 11. The piezoelectric actuator extends about 150 μm to instantaneously change the position of the piston 2 to jet the drop 8*a*. Next, the control unit 20 generates the piezoelectric actuator drive signal to make the voltage across the piezoelectric actuator zero volts to return the length of the actuator to the original length.

In step 125, the control unit 20 drives the linear stepping motor 3 to change the position f piston by about 150 μm in to align the surface of the liquid nozzle 1*a* with the tip position 1*c* of the nozzle 1*a* to prepare the next pipetting operation.

In the following step 130, the control unit 20 judges whether the desired amount of the liquid 8 has been pipetted. If No, processing in step 120 is repeated until the desired amount of the liquid 8 has been pipetted.

If the desired amount of the liquid 8 has been pipetted in step 130, the control unit 20 finishes the pipetting operation.

Figure 2B:
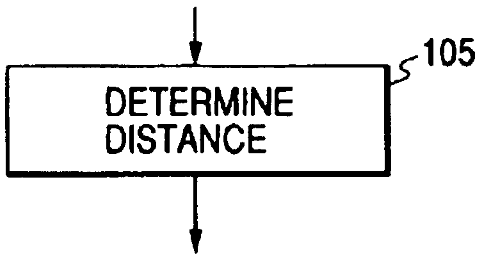
FIG. 2B is a partial flow chart in the first embodiment.

If the amount of the drop 8*a* is to be adjusted, the control unit 20 changes the voltage of the piezoelectric actuator drive signal to control the instantaneous position change of the piston 2. The amount of the drop is determined in the step 105 in the same manner as the first embodiment as shown in FIG. 2B. In step 105, the control unit 20 determines the distance of the instantaneous minute position change of the piston 2 in accordance with the amount of the drop 8*a*. This processing is executed before the sucking operation in step 110. The control unit 20 generates the piezoelectric actuator control signal to provide the distance of the instantaneous minute position change of the piston 2 determined in step 105.

If this operation is repeated to pipette the liquid 8 in another vessel, the processing in steps 120 and 130 is executed. If the liquid 8 remains after finish of the processing, the liquid 8 can be returned to the source vessel.

If another liquid is pipetted after pipetting the liquid 8, the used pipette 1 and the used piston 2 are exchanged with a new pipette 1 and a new piston 2 to avoid contamination.

<Third Embodiment>

Figure 4:
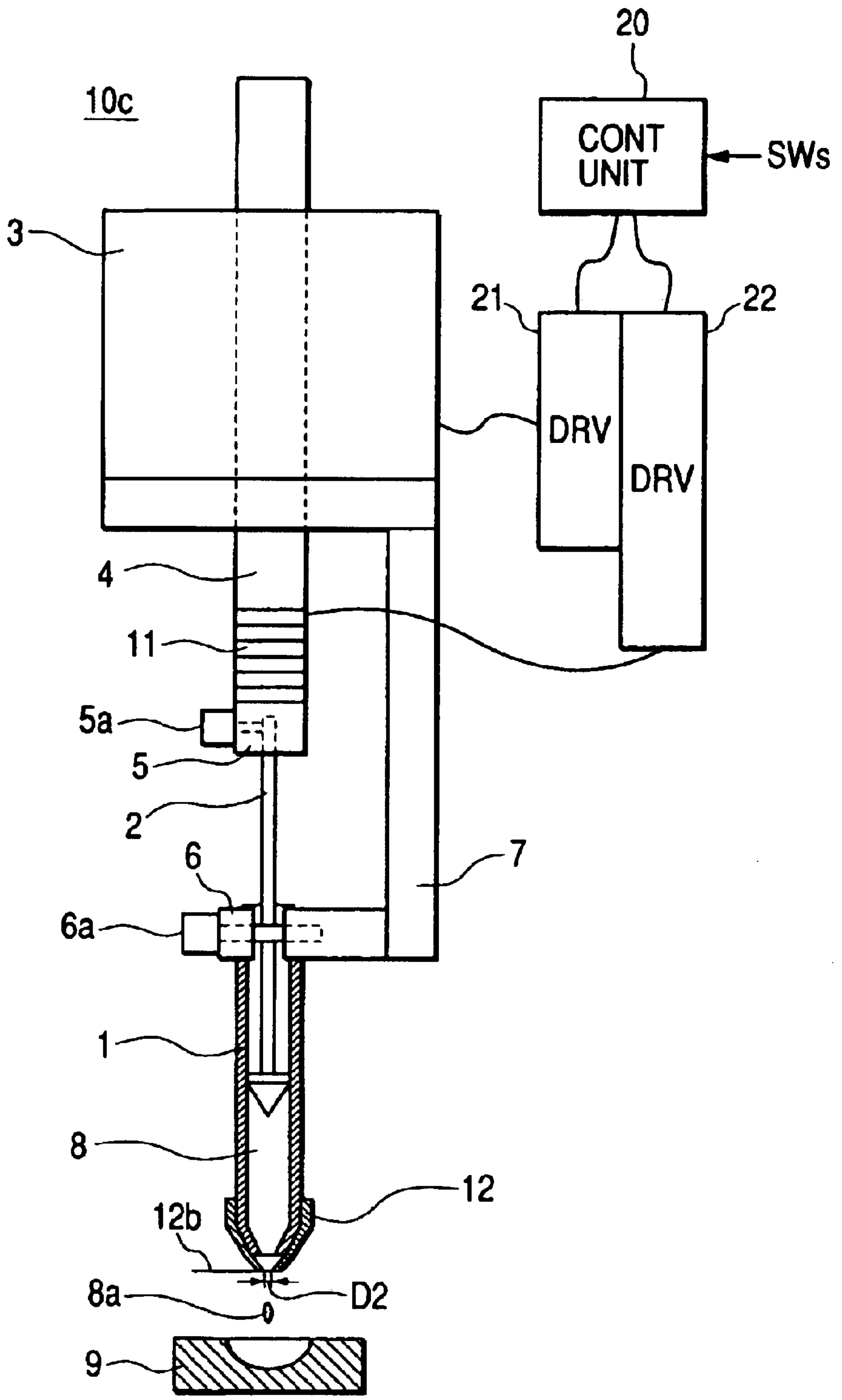
FIG. 4 is a side view of a pipetting apparatus according to a third embodiment.
Figure 5:
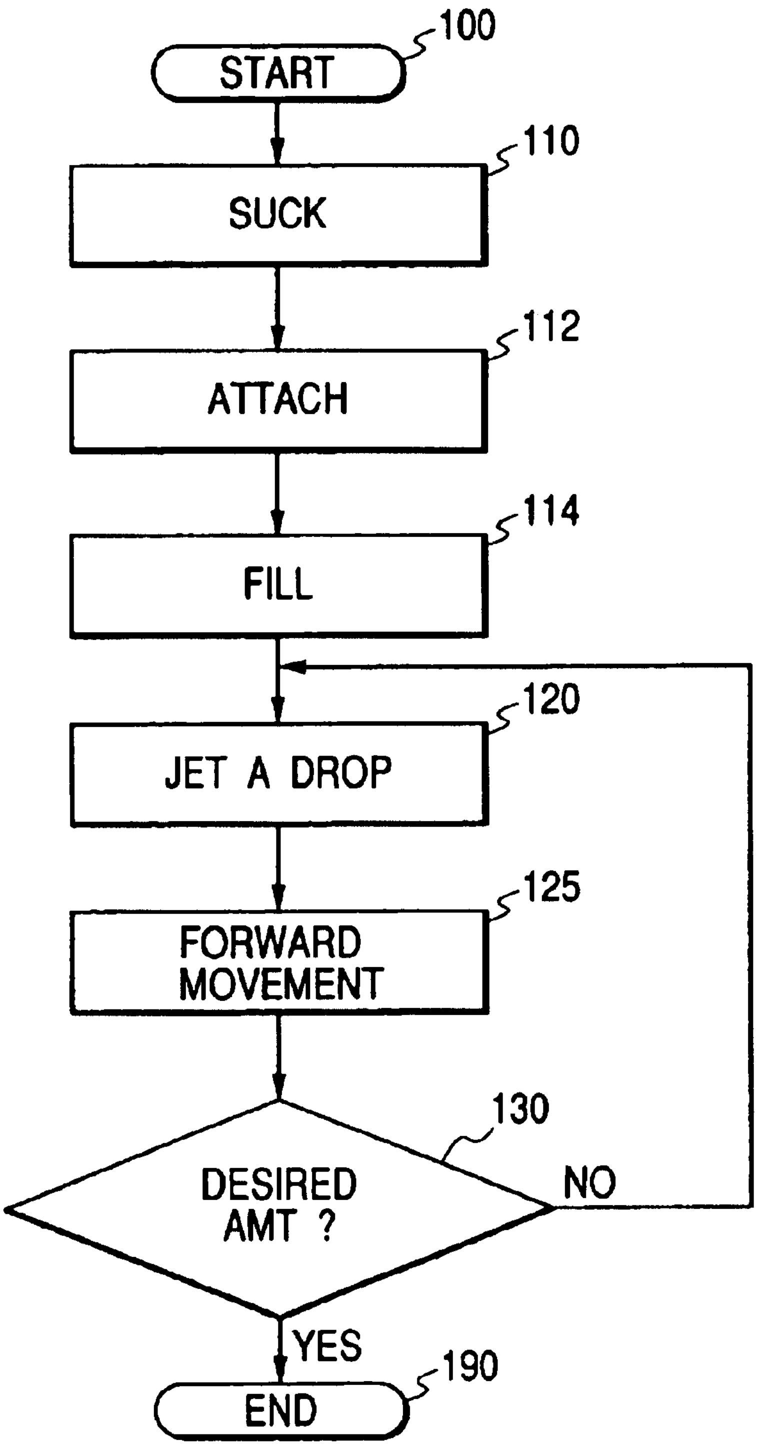
FIG. 5 depicts a flow chart showing a method of pipetting a liquid with the pipetting apparatus according to the third embodiment.

In the first to third embodiments, the amount of the drop 8*a* is higher than a hundred nanoliters. In this embodiment, a drop of which amount is lower than a hundred nanoliters is pipetted. FIG. 4 is a side view of a pipetting apparatus according to a third embodiment. FIG. 5 depicts a flow chart showing a method of pipetting a liquid with the pipetting apparatus according to the third embodiment.

The pipetting apparatus according to the third embodiment has substantially the same structure as that of the second embodiment. The difference is that an attachable nozzle cap 12 having a nozzle-cap nozzle (through hole) of which diameter D2 is smaller than the diameter D1 of the nozzle 1*a* is further provided.

The attachable nozzle cap 12 generates a drop 8*b* of the liquid of which amount is lower than that of the drop 8*a* in the first and second embodiments. That is, the minimum amount of the drop is determined in accordance with the diameter D2 of the nozzle-cap nozzle. Then, the diameter D2 of the attachable nozzle cap 12 is made smaller than the diameter D1 of the nozzle 1*a* in the first embodiment. The instantaneously position change of the piston 2 is similarly adjusted in accordance with the amount of the drop 8*b*.

In operation, the operation of the pipetting apparatus according to the third embodiment is substantially similar to that of the second embodiment. However, in the operation of sucking the liquid (step 110), it is better to suck the liquid without the attachable nozzle cap 12 to avoid the low speed due to the smaller diameter D2 of the attachable nozzle cap 12. Therefore, the attachable nozzle cap 12 is attached to the tip of the pipette 1 in step 112 after the sucking operation as shown in FIG. 5. In the following step 114, the control circuit 20 drives the piston 2 toward the attachable nozzle cap 12 to fill the liquid 8 in the attachable nozzle cap 12 such that a surface of the liquid 8 at the nozzle-cap nozzle (through hole) of the attachable nozzle cap 12 aligns with the tip position 12*b* of the through hole.

In step 120, the control unit 20 generates the piezoelectric driver control signal to provide a DC voltage across the piezoelectric actuator 11. The piezoelectric actuator extends to instantaneously change the position of the piston 2 to jet the drop 8*b*. Next, the control unit 20 generates the piezoelectric actuator drive signal to make the voltage across the piezoelectric actuator zero volts to return the length of the actuator to the original length.

In step 125, the control circuit 20 drives the linear stepping motor 3 to change the position of the piston 2 to align the surface of the liquid around the attachable nozzle cap 12 with the tip position 12*b* of the through hole (nozzle-cap nozzle) of the attachable nozzle cap 12 to prepare the next pipetting operation.

In the following step 130, the control unit 20 judges whether the desired amount of the liquid 8 has been pipetted. If No, processing in step 120 is repeated until the desired amount of the liquid 8 has been pipetted. If the desired amount of the liquid 8 has been pipetted, processing ends.

If the amount of the drop 8*b* is adjusted, the control unit 20 changes the voltage of the piezoelectric actuator drive signal to control the instantaneous position change of the position 2. The amount of the drop 8*b* is determined in the step 105 in the same manner as the first embodiment as shown in FIG. 2B. In step 105, the control unit 20 determines the distance of the instantaneous minute position change of the piston 2 in accordance with the amount of the drop 8*b*. This processing is executed before the sucking operation in step 110. The control unit 20 generates the piezoelectric actuator control signal to provide the distance of the instantaneous minute position change of the piston 2 determined in step 105. For example, the control unit 20 generates the piezoelectric actuator drive signal of DC 2V. In response to this, the piezoelectric driver 22 generates the drive signal of DC 60V which generates distance of 20 μm generating the drop 8*b* of which amount is lower than that of the drop 8*a*. In the first embodiment, if the distance of the instantaneous position change of the piston 2 is shortened less than 20 μm with the diameter D1, a portion of the liquid may not be jetted due to surface tension though the surface of the liquid at (the through hole of) the nozzle expands. On the other hand, in this embodiment, the diameter D2 is smaller than the diameter D1 in the first embodiment. Thus, the surface of the liquid at the nozzle-cap nozzle is more expands and then, finally, a portion of the liquid is jetted as the drop 8*b*. Accordingly, a more accurate pipetting operation is provided.

<Fourth Embodiment>

Figure 6:
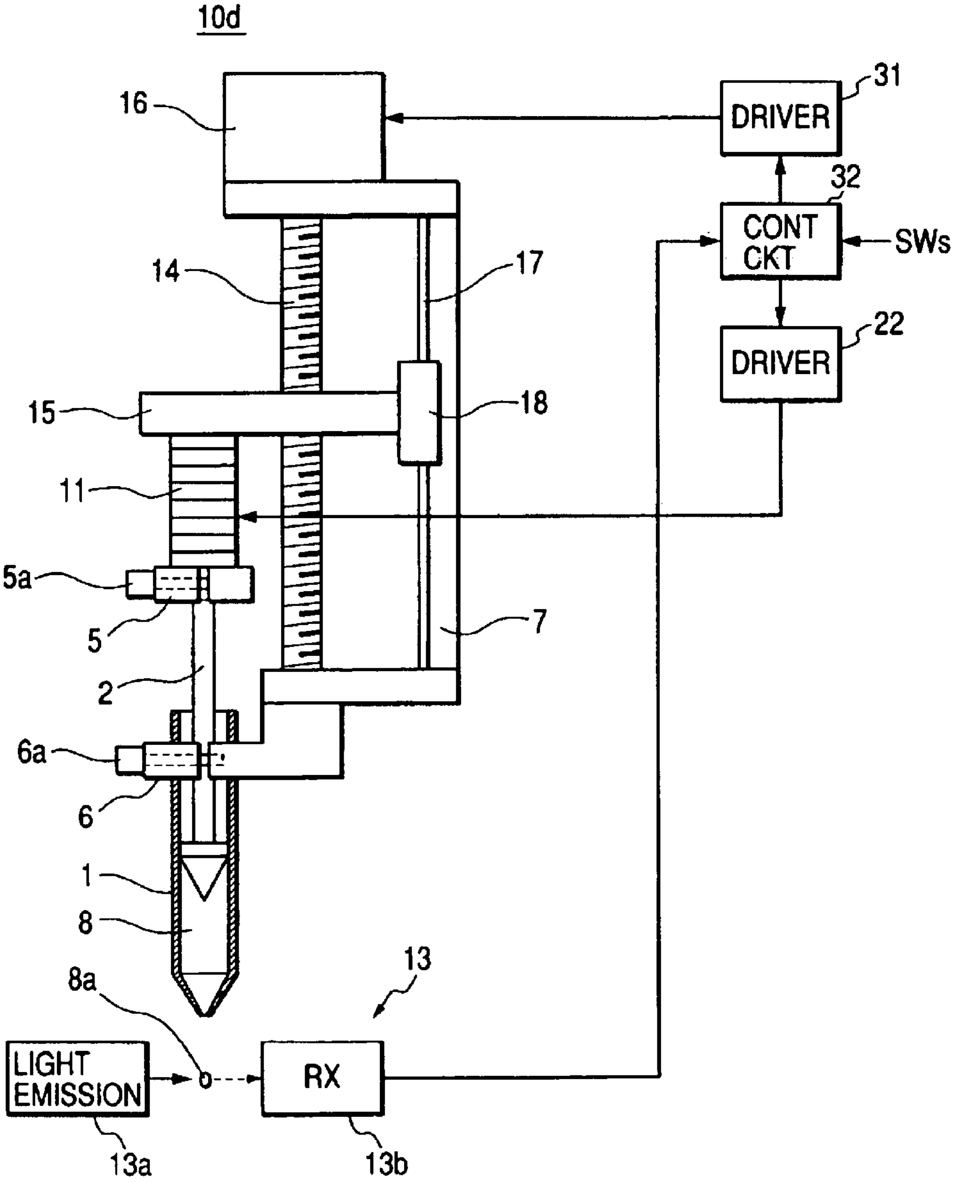
FIG. 6 is a side view of a pipetting apparatus according to a fourth embodiment.
Figure 7:
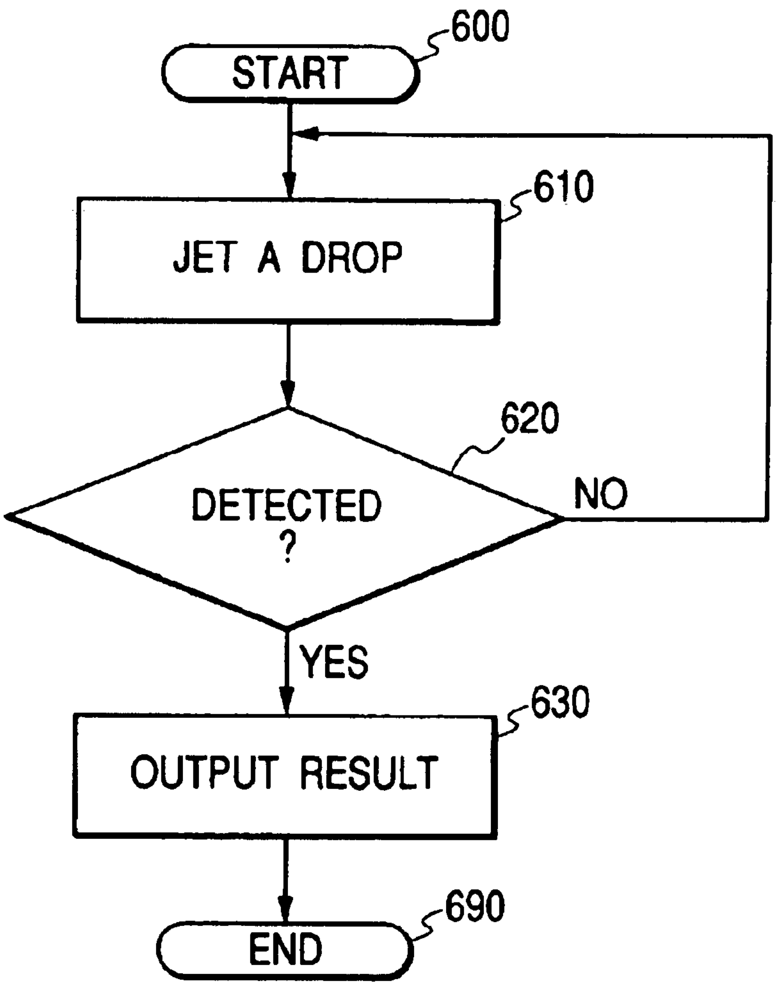
FIG. 7 depicts a flow chart showing a pipetting method in the pipetting apparatus according to the fourth embodiment.

FIG. 6 is a side view of a pipetting apparatus 10*d* according to the fourth embodiment and FIG. 7 depicts a flow chart showing a pipetting method in the pipetting apparatus 10*d*.

The pipetting apparatus according to the fourth embodiment has substantially the same structure as that of the first embodiment. The difference is that a drop detecting circuit 13 is further provided. Moreover, a rotary motor 16, a ball screw 14, and a slider 18 replace the linear motor 3. That is, the rotary motor 16 and the ball screw 14 moves (pushes and draws) the piston 2 in response to a drive signal from a driver 31 such that the rotation movement is converted into a linear movement by the ball screw 14 and the slider 18. On the other hand, the instantaneous minute position change is provided by the piezoelectric actuator 11 in the same manner as the second embodiment.

In this embodiment, reliability in the pipetting operation is improved with the drop detecting circuit 13. The drop detecting circuit 13 includes a light emission circuit 13*a* for emitting a light beam and a light receiving circuit 13*b* for receiving the light beam from the light emission circuit 13*a*. The light emission portion of the light emission circuit 13 is directed to a locus of the drop 8*a* (axis of the pipette 2). Thus, when the drop 8*a* crosses the light beam from the light emitting circuit 13*a* to the light receiving circuit 13*b*. The drop 8*a* interrupts the light beam. The detection signal indicative of interruption by the drop 8*a* outputted from the light receiving circuit 13*b* is supplied to the control circuit 32.

If the control circuit 32 has performed the instantaneous minute position change of the piston 2 and the drop 8*a* cannot be detected within a predetermined time interval, the control circuit 32 tries to perform the instantaneous minute position change for generating the drop 8*a* again.

More specifically, in FIG. 6, the control circuit 32 starts the processing in response to a switch (not shown). In step 610, the control circuit 32 generates the piezoelectric actuator drive signal to provide the instantaneous minute position change of the piston 2 (jet pipetting) in step 610. In the following step 620, the control circuit 32 checks the detection signal from the light receiving circuit 13*b*. If the control circuit 32 cannot detect the drop 8*a* within the predetermined time interval, processing returns to step 610 to perform the generating step of the drop 8*a* again. If the control circuit 32 can detect the drop 8*a* within the predetermined time interval, the control circuit 32 outputs the detection result in step 630 and processing ends. If the desired amount of the liquid has not been pipetted, this operation is repeated until the desired amount of the liquid is pipetted in the same manner as the first embodiment.

This detection operation can be performed only once before discharging the sucked liquid for testing or every generation of drop. In either case, reliability in the pipetting operation is increased.

As mentioned above, in the fourth embodiment, the drop 8*a* jetted from the pipette 1 is detected, it is confirmed that the portion of the liquid is jetted in response to the instantaneous position changing and the drop detection circuit, and a confirmed result is outputted.

In the above-mentioned embodiments, the pipette 1 has an inner diameter of 2 mm and a diameter D1 of the pipette 1 is 0.5 mm. If water is sucked as the liquid, the piston 2 is moved by about 160 μm for 2 ms to jet a drop water. The amount of the drop varies with the distance of movement of the piston 2 in a range. In the above-mentioned embodiments, the amount of the drop 8*a* is controlled from about 40 to 160 nanoliters. Moreover, when the attachable nozzle cap 12 having the diameter D2 of 0.2 mm is used, the amount of the drop 8*b* is controlled up to about 10 nanoliters.

What is claimed is:

1. A pipetting apparatus comprising:

a pipette having a nozzle;

pipette holding means for holding said pipette;

a piston fluid-tightly sliding along an inner wall of said pipette, a fluid receiving inner space being defined by said inner wall of said pipette, the nozzle and a lower portion of said piston, and varying in size as said piston slides along the inner wall of said pipette;

piston holding means for holding a portion of said piston; and position changing means including a means for varying a sliding speed of said piston, wherein said means for varying said sliding speed is an actuator for changing a position of said piston with said piston holding means to suck a liquid into said pipette at a first speed and for changing said position of said piston with said piston holding means by a short distance with respect to said pipette holding means at a second speed higher than said first speed to jet a portion of said liquid in said pipette through said nozzle as a drop, wherein said short distance is determined in accordance with a desired amount of said jetted portion of said liquid.

2. A pipetting apparatus as claimed in claim 1, wherein said actuator comprises a motor, said pipetting apparatus further comprises another position changing means including said motor for changing said position of said piston with said motor in response to a low speed signal to suck and discharge a desired amount of said liquid, and said motor is commonly used between said position charging means and said another position changing means.

3. A pipetting apparatus as claimed in claim 1, wherein said position changing means comprises a piezoelectric actuator.

4. A pipetting apparatus as claimed in claim 1, further comprising an attachable nozzle cap being attachable to said pipette and having a nozzle-cap nozzle for jetting said portion of said liquid through said nozzle and said nozzle-cap nozzle, a diameter of said nozzle-cap nozzle being smaller than that of said nozzle.

5. A pipetting apparatus as claimed in claim 1, further comprises:

detection means for detecting said portion of said liquid jetted from said pipette; and confirming means in response to said position changing means and said detection means for confirming that said portion of said liquid is jetted and outputting a confirmed result.

6. A pipetting apparatus as claimed in claim 1, wherein said liquid is sucked into said inner space defined by said pipette and said piston in accordance with said position of said piston.

7. A pipetting apparatus as claimed in claim 1, wherein a position at which said piston fluid-tightly slides along said inner wall of said pipette is movable to said pipette along said inner surface.

8. A pipetting apparatus as claimed in claim 1, wherein said first speed is sufficiently low to prevent formation of a space between said piston and said inner wall of said pipette while said piston slides along the inner wall to suck liquid into said pipette, for preventing air from entering said fluid receiving inner space through said space therebetween.

9. A pipetting apparatus as claimed in claim 1, further comprising supporting means for supporting said pipette holding means, said piston holding means, and said position changing means.

10. A pipetting apparatus as claimed in claim 9, wherein said supporting means is capable of being hand-held.

11. A pipetting apparatus as claimed in claim 9, wherein said supporting means is capable of being hand-held by a robot arm.

12. A pipetting apparatus as claimed in claim 1, wherein said pipette is replaceable with said pipette holding means, and said piston is replaceable with said piston holding means.

13. A pipetting apparatus comprising:

a pipette having a nozzle;

pipette holding means for holding said pipette;

a piston fluid-tightly sliding along an inner wall of said pipette, an inner space defined by said pipette and said piston being directly coupled to said nozzle;

position holding means for holding a portion of said piston; and position changing means including a means for varying a pulse rate of said pistol, wherein said means for varying said pulse rate is a linear pulse motor for changing a position of said piston with said piston holding means in response to a pulse signal at a first pulse rate to suck said liquid into said pipette and for changing said position of said piston with said piston holding means by a short distance with respect to said pipette holding means in response to said pulse signal at a second pulse rate to jet a portion of a liquid in said pipette through said nozzle as a drop, wherein said second pulse rate is higher than said first rate, and wherein said short distance is determined in accordance with a desired amount of said jetted portion of said liquid.

14. A pipetting apparatus as claimed in claim 13, further comprising an attachable nozzle cap being attachable to said pipette and having a nozzle-cap nozzle for jetting said portion of said liquid through said nozzle and said nozzle-cap nozzle, a diameter of said nozzle-cap nozzle being smaller than that of said nozzle.

15. A pipetting apparatus as claimed in claim 13, further comprises;

detection means for detecting said portion of said liquid jetted from said pipette; and confirming means in response to said position changing means and said detection means for confirming that said portion of said liquid is jetted and outputting a confirmed result.

16. A pipetting apparatus as claimed in claim 13, wherein said liquid is sucked into said inner space defined by said pipette and said piston in accordance with said position of said piston.

17. A pipetting apparatus as claimed in claim 13, wherein a position that said piston fluid-tightly slides along said inner wall of said pipette is movable to said pipette along said inner surface.

18. A pipetting apparatus as claimed in claim 13, wherein said first speed is sufficiently low to prevent formation of a space between said piston and said inner wall of said pipette while said piston slides along the inner wall to suck liquid into said pipette, for preventing air from entering said fluid receiving inner space through said space therebetween.

19. A pipetting apparatus as claimed in claim 13, further comprising supporting means for supporting said pipette holding means, said piston holding means, and said position changing means.

20. A pipetting apparatus as claimed in claim 13, wherein said supporting means is capable of being hand-held.

21. A pipetting apparatus as claimed in claim 13, wherein said supporting means is capable of being hand-held by a robot arm.

22. A pipetting apparatus as claimed in claim 13, wherein said pipette is replaceable with said pipette holding means, and said piston is replaceable with said piston holding means.

23. A method of pipetting a liquid with a pipetting apparatus comprising: a pipette having a nozzle;

pipette holding means for holding said pipette;

a piston fluid-tightly sliding along an inner wall of said pipette, a fluid receiving inner space being defined by said inner wall of said pipette, the nozzle and a lower portion of said piston, and varying in size said piston slides along the inner wall of said pipette;

piston holding means for holding a portion of said piston;

position changing means including a means for varying a sliding speed of said piston, wherein said means for varying said sliding speed is an actuator for changing a position of said piston with said piston holding means to suck a liquid into pipette at a first speed and for changing said position of said piston with said piston holding means by a short distance with respect to said pipette holding means at a second speed higher than said first speed to jet a portion of said liquid in said pipette through said nozzle as a drop, and an attachable nozzle cap being attachable to said pipette and having a nozzle-cap nozzle for jetting said portion of said liquid through said nozzle and said nozzle-cap nozzle, a diameter of said nozzle-cap nozzle being smaller than that of said nozzle, wherein said short distance is determined in accordance with a desired amount of said jetted portion of said liquid, said method comprising the steps of:

sucking said liquid into said pipette with said position changing means through said nozzle without said attachable nozzle;

attaching said attachable nozzle having said nozzle-cap nozzle to jet said portion of said liquid through said nozzle and said nozzle-cap nozzle; and operating said position changing means to jet a portion of said liquid in said pipette through said nozzle and said nozzle-cap nozzle as a drop.

24. A pipetting apparatus comprising:

a pipette having a nozzle;

pipette holding means for holding said pipette;

a piston fluid-tightly sliding along an inner wall of said pipette, a fluid receiving inner space being defined by said inner wall of said pipette, the nozzle and a lower portion of said piston, and varying in size as said piston slides along the inner wall of said pipette;

piston holding means for holding a portion of said piston; and position changing means including a means for varying a sliding speed of said piston, wherein said means for varying said sliding speed is an actuator for changing a position of said piston with said piston holding means to suck a liquid into said pipette at a first speed whereby a space is prevented from being formed between the inner wall of said pipette and a sliding surface of said piston which is to be kept in fluid-tight contact with the inner wall of said pipette and for changing said position of said piston with said piston holding means by a short distance with respect to said pipette holding means at a second speed higher than said first speed to jet a portion of said liquid in said pipette through said nozzle as a drop, wherein said short distance is determined in accordance with a desired amount of said jetted portion of said liquid.

25. A pipetting apparatus as claimed in claim 24, wherein said liquid is sucked into said inner space defined by said pipette and said piston in accordance with said position of said piston, a position at which said piston fluid-tightly slides along said inner wall of said pipette is movable to said pipette along said inner surface, and said first speed is sufficiently low to prevent the air from entering said inner space through a space which would be made between said piston and said inner wall of said pipette while said liquid is sucked into said pipette, said pipetting apparatus further comprising:

supporting means for supporting said pipette holding means, said piston holding means, and said position changing means, wherein said supporting means is capable of being hand-held, wherein said pipette is replaceable with said pipette holding means, and said piston is replaceable with said piston holding means.

* * * * *